United States Patent [19]

Hampshire et al.

[11] Patent Number: 5,475,545
[45] Date of Patent: Dec. 12, 1995

[54] METHOD FOR REDUCING NOISE DURING SEEKS IN A HARD DISK DRIVE

[75] Inventors: Randall D. Hampshire; Lealon R. McKenzie, both of Edmond; Otis L. Funches, Oklahoma City, all of Okla.

[73] Assignee: Seagate Technology, Inc., Scotts Valley, Calif.

[21] Appl. No.: 676,787

[22] Filed: Mar. 28, 1991

[51] Int. Cl.⁶ .................................................. G11B 5/596
[52] U.S. Cl. .................................. 360/78.06; 360/78.07; 360/78.04
[58] Field of Search .................... 360/78.07, 78.06, 360/78.04; 369/44.28

[56] References Cited

U.S. PATENT DOCUMENTS

| | | | |
|---|---|---|---|
| 3,699,555 | 10/1972 | Du Vall | 360/78.06 |
| 4,314,291 | 2/1982 | Oda et al. | 360/78.07 |
| 4,333,117 | 6/1982 | Johnson | 360/78.02 |
| 4,622,604 | 11/1986 | Hashimoto et al. | 360/78.02 |
| 4,907,109 | 3/1990 | Senio | 360/78.04 |
| 4,931,889 | 6/1990 | Osafune | 360/78.07 |
| 4,937,689 | 6/1990 | Seaver et al. | 360/78.07 |
| 4,954,907 | 9/1990 | Takita | 360/78.07 |
| 4,956,831 | 9/1990 | Sarraf et al. | 369/32 |
| 4,965,501 | 10/1990 | Hashimoto | 360/78.07 X |
| 5,056,072 | 10/1991 | Wachi | 369/32 |
| 5,119,250 | 6/1992 | Green et al. | 360/78.06 |
| 5,233,486 | 8/1993 | Albert et al. | 360/78.04 X |

Primary Examiner—Aristotelis Psitos
Assistant Examiner—James T. Wilson
Attorney, Agent, or Firm—Bill D. McCarthy; Louis W. Watson; Edward P. Heller, III

[57] ABSTRACT

A method for effecting seeks of a transducer head across a data storage disk wherein the head is accelerated over a first sequence of time intervals and decelerated over a second sequence of time intervals. In each time interval of the first sequence, the head is accelerated in relation to the difference between the actual head velocity and a current demand velocity that is determined by incrementing the demand velocity for the previous interval by an amount that is a fraction of the difference between the previous demand velocity and a stored profile velocity selected in accordance with the current location of the head. In each time interval of the second sequence, the head is decelerated in relation to the difference between the actual head velocity and a stored profile velocity selected in accordance with the current location of the head.

3 Claims, 4 Drawing Sheets

METHOD FOR REDUCING NOISE DURING SEEKS IN A HARD DISK DRIVE

BACKGROUND OF THE INVENTION

1. Field of the Invention

The present invention relates generally to improvements in hard disk drive servo methods and, more particularly, but not by way of limitation to improvements in methods for moving transducer heads across disks of hard disk drives.

2. Brief Description of the Prior Art

Computer programs and data generated by a computer are often magnetically stored in a hard disk drive; that is, a device having one or more rotating aluminum disks that have magnetizable coatings so that transducer heads, through which a current can be passed to produce a magnetic field, that fly over the disk can magnetize successive cells of tracks defined in the disk coatings. The data, or programs, can be read at a later time by using the transducer head to detect changes in the magnetic field along the surfaces of the disks resulting from the magnetization of the coatings and movement of the disk surface by the transducer heads.

The major advantages of the hard disk drive are that they are capable of economically storing large amounts of data which can be accessed very quickly. For example, a hard disk drive capable of storing an amount of data of the order of a gigabyte can effect the storage of a block of data, or retrieve a block, in a time that is measured in milliseconds. Because of these advantages, hard disk drives are being increasingly selected as a long term data storage device in computer systems.

The advantages of the hard disk drive are achieved by storing the data on closely spaced, concentric data tracks defined on the disks and providing the drive with a servo system that accurately positions the transducer heads with respect to these tracks. To this end, the transducer heads are mounted on an actuator via arms that extend along the disk surfaces and are movable in response to currents passed through a coil on the actuator, such coil being immersed in a magnetic field so that the current gives rise to a force on the coil in accordance with the familiar Lorentz relation. Servo data is written to one or more of the disks to be read during track following %o provide a position error signal that is proportional to the misalignment of the transducer head with the track being followed and a control signal is generated from the a position error signal and transmitted to a power, transconductance amplifier that passes the current through the actuator coil to form a closed loop servo system that corrects such misalignment. The use of a closed loop servo system enables the data tracks to be closely spaced to maximize the data storage capacity of the drive.

In order to read or write a selected block of data, the data tracks are divided into sectors which are assigned to specific blocks and control circuitry is provided to address the sector and track at which the data is located. Thus, the transducer head can be moved to the track on which any selected block of data is located or on which it is to be written by addressing the track and operating the servo system to carry out a seek to that track. In the seek operation, the servo system receives the address of the destination track and generates control signals that cause the transducer heads to initially accelerate toward the destination track and subsequently decelerate as it nears such track.

A common way of controlling the seek to cause the movement of the transducer head to the destination track is to develop a velocity profile that provides the velocity the transducer head should have at varying distances from the destination track and, at each of a succession of tracks terminating with the destination track, providing a control signal to the power amplifier that is directly proportional to the difference between the profile velocity and the actual velocity of the transducer head. The profile is shaped with respect to the number of tracks remaining in a seek to cause the transducer head to initially accelerate toward the destination track and subsequently decelerate to the track. In long seeks, these stages of the seek may be separated by a stage in which the transducer head traverses a series of tracks at a maximum speed that is selected on the basis of any of a number of criteria used by the manufacturer of the disk drive. For example, the maximum speed may be chosen to be the maximum speed the transducer head can attain with the power supply that is used to operate the servo system.

The use of a velocity profile that can be developed with respect to any selected servo system operating criteria can be used to minimize the time required for the seek to occur and still reach the destination track with a speed that is neither too large nor too small to effectuate a rapid settling of the transducer head on the destination track at the end of the seek. Specifically, since the control signal is proportional to the difference between the profile velocity and the actual velocity, the transducer head can be caused to rapidly accelerate at the beginning of the seek by providing a profile that calls for large velocities at the beginning of the seek and then rapidly tapering the profile to zero as the destination track is reached.

A problem that has arisen with respect to the use of a velocity profile to effect seeks to a destination track is that noise is generated during the seek and, moreover, the intensity of the noise is determined by the form of the profile. In general, the greater the acceleration called for by the profile, the noisier the disk drive during the seek. Such noise can be very distracting to the user of a computer so that it is desirable that it be limited in a way that is consistent with the need for limitation of the time required for making seeks.

In the past, this compromise has been difficult to implement because of the manner in which the velocity profile is developed. In general, the profile is developed by requiring that the coil current satisfy a selected current versus time relationship during deceleration assuming that the transducer head begins deceleration from the maximum velocity that will be attained during the seek. Since the force exerted on the actuator is proportional to the coil current, a knowledge of the velocity at the start of the deceleration and the current profile permits the velocity and location of the head to be determined at any time during deceleration. Thus, the velocity profile, as a function of tracks remaining in the seek, can be found for the deceleration of the head by eliminating the time in equations expressing the velocity and location. Remaining portions of the profile, that is, portions of the profile corresponding to acceleration of the transducer head and coasting after the maximum head velocity has been attained, are generated by just setting the profile velocity equal to the maximum velocity. It will be noted that only the deceleration of the transducer head is utilized in developing the profile. While it would, in principle, be possible to develop the profile for the entire seek, in practice such development would be very difficult because of the dependence of the profile development method on the head beginning the deceleration with a known speed.

The noise arises from large differences between the profile velocity and the actual velocity that will give rise to large, rapidly changing currents through the actuator coil during acceleration and deceleration of the transducer head. The currents give rise to the forces that accelerate the transducer head so that passing large, rapidly changing currents through the actuator coil has the same effect that striking the actuator with a mallet would have; that is, a large impulse is delivered to the actuator. Moreover, the magnets that are mounted on the case of the disk drive to provide the magnetic field in which the actuator coil is immersed experience the same impulse in accordance with Newton's third law of motion. The effect of these impulses is to excite vibrational modes of the case, the actuator and other portions of the drive. While this effect can be minimized for the deceleration of the actuator by appropriate shaping of the current versus time relation during deceleration from which the velocity profile is developed, the effect is not easily treated for acceleration because of the difficulty in modeling the entire seek that has been noted above.

Because of this noise problem, several suggestions have been made concerning the manner in which the seek is controlled. Thus, for example, it has been suggested that the seek be performed by requiring the acceleration to be a selected function of time for the entire seek. The difficulty with this approach is that the Lorentz force is not the only force on the actuator; for example, the actuator is also subjected to windage forces caused by the swirling of air by the disk rotation and the support of transducer heads above the disk surfaces by the air current so provided. Similarly, flex forces are exerted on the actuator by plastic strips that carry electrical conductors between the drive case and the actuator. In general, these forces depend upon the location of the destination track and the initial track from which a seek is commenced. Unless carefully compensated, these forces can cause the seek to terminate at an unsuitable location with respect to the destination track.

It has also been suggested that the gains of amplifiers in the servo circuit be adjusted during the acceleration stage of a seek in relation to the distance remaining in the seek so that such amplifiers have a very low gain at the start of a seek and a higher gain as the seek nears completion. This difficulty with this approach is that it shifts the problem of developing a complete seek profile to one of developing a gain profile. Thus, nothing is gained. Moreover, since the amplifier gains are very low at the beginning of the seek and are increased in relation to the distance remaining in the seek, the Lorentz force on the actuator coil will be very small at the beginning of a seek and can be balanced by other forces on the actuator. In this case, the actuator will hang up on the track from which the seek is initiated.

As a result of the aforementioned problems, the elimination of noise during seeks in a hard disk drive has, prior to the present invention, proven to be a difficult problem. While it can be solved, the solutions that have been suggested in the past give rise to new problems that make the solution as difficult to implement as profiling the entire seek.

SUMMARY OF THE INVENTION

The present invention provides a method for limiting noise during seeks of a transducer head that is easily implemented in any hard disk drive and, moreover, is not affected by forces that are exerted on the actuator in addition to the Lorentz force that is utilized to effect the seek. Indeed, adaptive techniques for adjusting terminal portions of the velocity profile that have been used in the past to minimize the effect of these forces on, for example, settle time once the destination track has been reached are carried directly over into seeks that are carried out in accordance with the method of the invention.

The present invention is based on the generation of control signals in accordance with demand velocities that are generated from profile velocities taken from a conventional velocity profile developed as described above at a first sequence of time intervals during the acceleration of the transducer head. More specifically, a demand velocity fraction is determined for each seek length and stored in a look-up table in a microcomputer of which the servo circuit is comprised and the demand velocity, during acceleration, at any one of the time intervals is generated by incrementing the demand velocity for the previous interval by the product of the demand velocity fraction and the difference between the current profile velocity; that is, the velocity taken from the profile for the current location of the transducer head, and the previous demand velocity. The previous demand velocity for the first interval is selected to be zero so that the current through the actuator coil will be proportional to a fraction of the profile velocity rather than to the profile velocity. Thereafter, at each time interval, the demand velocity will be lower than the profile velocity but the difference between the profile and demand velocities will steadily decrease. The net result is that the actuator current and the rate of increase of the actuator current during acceleration of the transducer head can be adjusted by merely adjusting the demand velocity fraction. When the transducer head reaches a track for which the profile velocity is less than the previous demand velocity, deceleration is commenced by merely setting the demand velocity for each of a sequence of second time intervals equal to the profile velocity. Thus, the generation of noise during a seek can be limited, during acceleration, by selection of the demand velocity fraction to limit the actuator current and its rate of change and, during deceleration, by selection of the current versus time profile used to develop the velocity profile from which the profile velocities are taken.

An important object of the present invention is to minimize noise that is generated by internal forces between components of a hard disk drive during movement of transducer heads from one track to another.

Another object of the invention is to effect such minimization in a way that is easily implemented in substantially any hard disk drive.

Other objects, features and advantages of the present invention will become apparent from the following detailed description when read in conjunction with the drawings and appended claims.

Figure 1:
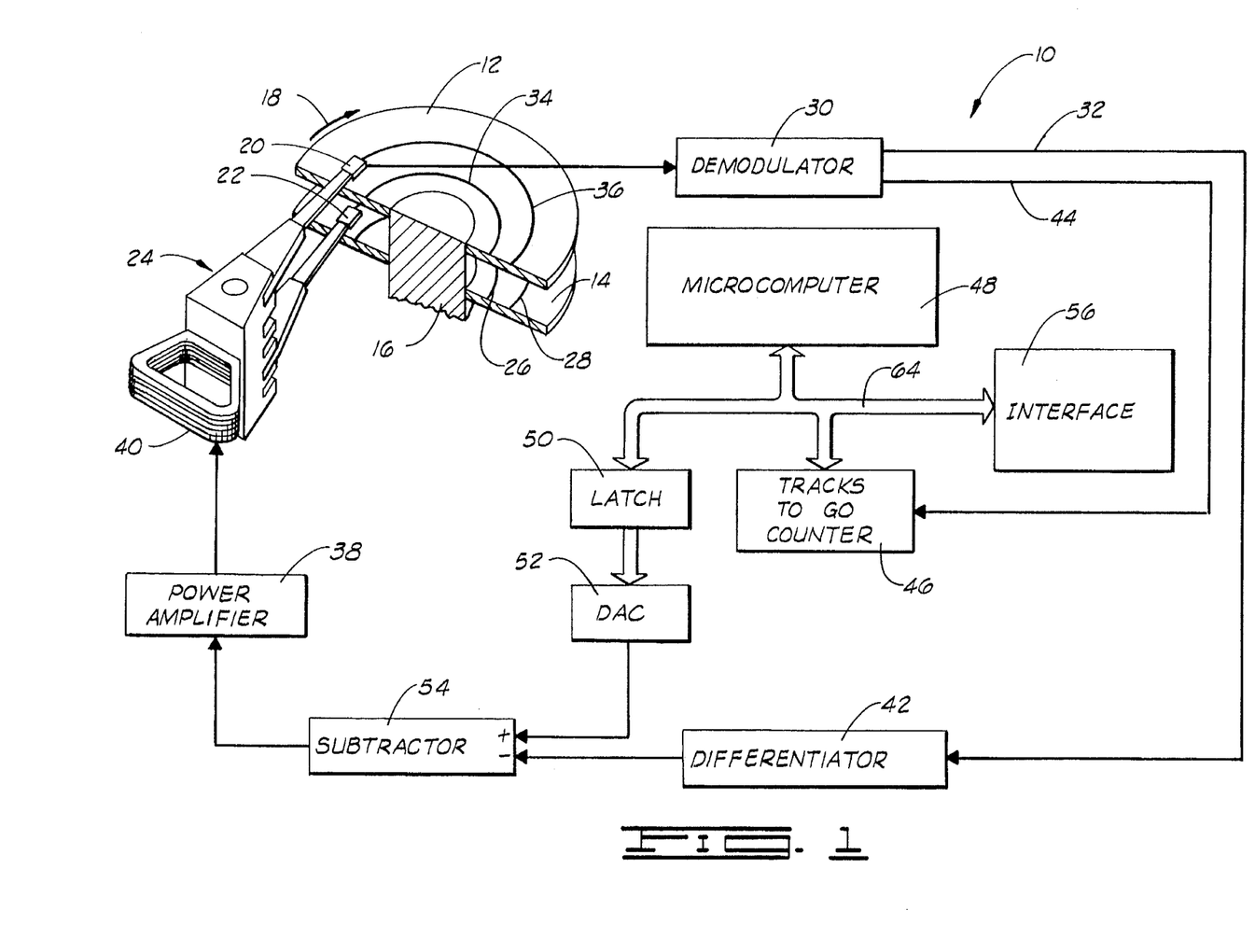
FIG. 1 is a schematic representation of a hard disk drive including portions of the servo circuit used in seeking between tracks on rotating disks of the drive.

DESCRIPTION OF FIG. 1

In order to provide a complete understanding of the seek method of the present invention, it will be useful to consider a had disk drive in which the invention might be practiced. For this purpose, portions of a typical hard disk drive, indicated by the general reference numeral 10, have been schematically illustrated in FIG. 1. The hard disk drive 10 is comprised of a plurality of aluminum disks, two of which 12, 14 have been shown in FIG. 1, that are mounted on a spindle 16 for rotation in the direction 18 about their common axis. The disks 12, 14 are provided with magnetizable surface coatings so that portions of the surfaces can be magnetized by transducer heads, two of which 20, 22 have been shown, that are mounted on a pivotable actuator 24 adjacent the disks 12, 14, so that, during operation of the drive 10, the heads 20, 22 "fly" over the surfaces of the disks 12, 14 respectively in close proximity to the surfaces. Alternatively, the transducer heads 20, 22 can be utilized to detect changes in the magnetization of disk surfaces so that information written to the disk surface coatings by magnetization of such coatings can be subsequently read.

A major advantage of a hard disk drive over other data storage devices, such as floppy disks, is that they are capable of storing large amounts of data and, to this end, a series of closely spaced concentric data tracks, two of which 26, 28 have been shown on the disk 14, are defined on at least selected ones of the disks 12, 14. During data writing and reading, a transducer head is maintained in close radial alignment with a selected data track so that a read/write circuit (not shown) that receives data from a host computer (not shown) can be operated to magnetize successive cells along the data track in relation to the data pattern and subsequently read the data for return to the host computer.

The hard disk drive is further comprised of a servo circuit (not generally designated in the drawings) that is used both to maintain the radial alignment of the transducer heads with the data tracks in a track following mode of operation and to move the transducer heads from an initial track currently being followed to a destination track, to which data is to be written or from which data is to be read, in a seek mode of operation. By use of such a servo circuit, the data tracks can be very closely spaced to provide the large data capacity that has been noted above.

A scheme which is commonly used to effect both track following and seeking is to select one disk surface as a dedicated servo surface, to which a servo pattern is written, read this pattern as the disk rotates to determine the current location of the transducer heads with respect to the tracks on the disks, and adjust the position of the actuator accordingly. In order to provide a complete disclosure of the invention, FIG. 1 contemplates that such a scheme is employed in the hard disk drive 10 shown therein and that the upper surface of the disk 12 is the dedicated servo surface to which a servo pattern, such the tri-phase servo pattern taught by Donald W. Janz in U.S. Pat. No. 4,811,135, has been written. However, it will be clear to those skilled in the art that such contemplation is for purposes of explanation only; as will become clear below, the method of the present invention is not limited to use in hard disk drives that employ dedicated servo surfaces nor is it limited in the type of servo pattern that might be used in carrying out track following or seeking.

With these considerations in mind, the transducer head 20, often referred to as a servo head, is electrically connected to a demodulator 30 that receives electromotive force pulses induced in the head 20 by passage of edges of the servo pattern thereby and generates raw servo signals that are used by the servo circuit to effect either track following or seeking. As is common practice, the demodulator 30, which is of conventional construction, senses the relative magnitudes of successive emf pulses and provides a servo position error signal, on a conducting path 32, whose magnitude is proportional to the displacement of the servo head 20 from the nearest servo track, two which have been indicated at 34 and 36 in FIG. 1, that are defined by the servo pattern. During track following, the servo position error signal is transmitted to a fine control circuit (not shown) that generates a control signal that is, in turn, transmitted to the input of a power, transconductance amplifier 38 and the amplifier 38 adjusts the current through a coil 40 on the end of the actuator 24 in proportion to the magnitude of the control signal. The coil 40 is immersed in a magnetic field provided by permanent magnets (not shown) mounted about the coil so that a force tending to pivot the actuator 24 is exerted on the actuator in proportion to the current through the coil 40 in accordance with the Lorentz relation. Thus, during track following, the servo circuit provides control signals indicative of the location of the servo head 20 in a fine control region about the track being followed and the servo circuit continually moves the actuator 24 to maintain the servo head in radial alignment with a selected servo track. The data tracks on remaining disk surfaces are arranged in cylinders that each include a servo track and the transducer heads 20, 22 are vertically aligned so that servo track following by the servo head 20 results in data track following by the data transducer head 22.

In order to effect track seeking, with which the present invention is concerned and which will be described in detail below, the servo position error signals are differentiated to obtain the velocity of the servo head across the surface of the disk 12 and, for this purpose, the servo circuit shown in FIG. 1 is comprised of a differentiator 42 which receives the servo position error signals on the conducting path 32. Further, the demodulator 30 also provides track crossing signals, on a conducting path 44, indicative of movement of the servo head from the fine control region about one track to the fine control region about an adjacent track, that are received by a tracks to go counter 46 whose purpose will be discussed below.

The present invention contemplates that seeks between tracks will be accomplished by comparing the actual velocity of the servo head 20 to a demand velocity generated as will be discussed below and, to this end, the servo circuit shown in FIG. 1 is comprised of a microcomputer 48 that generates the demand velocity and periodically outputs such velocity to a latch 50 and, via a digital to analog converter 52, to the positive input of a conventional subtractor 54. The negative input of the subtractor 54 receives the output of the differentiator 42 so that the output of the subtractor provides a control signal that is proportional to the difference between the demand and actual velocities of the servo head 20. The output of the subtractor 54 is connected to the input of the power amplifier 38 so that the servo head is accelerated and decelerated, during seeks, in proportion to the difference between the actual velocity of the servo head 20 and the demand velocity. Thus, by providing a sequence of demand velocities, the servo head can be caused to initially accelerate from the track it is currently following and then decelerate to any selected destination track. Such selection is provided to the microprocessor 48 from an interface 56 that communicates the hard disk drive 10 with a host computer which generates data stored in the drive.

In order to provide a full appreciation of the present invention, it will be useful to first consider the manner in which seeks are conventionally effected and the noise problem that has arisen as a consequence of such mode of seeking. In the past, seeking has been effected by outputting to the latch 50 a sequence of demand velocities that are taken from a velocity profile that is generated in a manner shown in FIG. 2. Initially, the development of a velocity profile begins with the selection of a current profile that indicates the desired current through the actuator coil 40 as a function of time during deceleration of the servo head 20 to a destination track which may be any track on the disk. Typically such profile will have the form indicated at 58 in FIG. 2(a) in which the coil current has been plotted on the ordinate, time has been plotted on the abscissa and deceleration has been indicated by negative values of the current. Acceleration will be indicated by positive currents. The current profile 58 can be selected in accordance with any desired criteria including vibration of the hard disk drive and consequent noise that may be generated during a seek. In particular, and as will be discussed below, noise can be minimized during deceleration by requiring that the rate of change of current with time be maintained below a preselected value that can be determined experimentally. (The current through the coil 40 can be measured in a manner that has been described in U.S. patent application Ser. No. 442,194 entitled "Adaptive Velocity Profile Selection Based on Torque Constant Measurement" filed Nov. 28, 1989 by David C. Waugh and Robert D. Murphy, the teachings of which are hereby incorporated by reference.)

Once the current profile 58 has been selected, the velocity of the head 20 as a function of time during deceleration can be determined from a selected maximum velocity the head 20 is to attain during a seek by integration of the profile 58. (The total time for the deceleration is selected so that, for a particular servo system, the selected profile 58 will cause the head to come to rest at the destination track at the end of the deceleration.) A second integration will yield the distance that the servo head will move as a function of time during the deceleration so that elimination of time between the velocity and distance expressions will yield a deceleration portion 60 of a velocity profile that indicates a profile velocity as a function of the number of tracks to go with the destination track corresponding to zero tracks to go as indicated in FIG. 2(b). The portion 60 of the velocity profile will be defined only for the number of tracks required to bring the head 20 to rest, using the current profile 58, from the maximum velocity during a seek as indicated at vmax in FIG. 2(b). The velocity profile is then extended to any number of tracks by selecting the value vmax for the profile velocity for longer seeks as indicated by the portion 62 of the curve shown in FIG. 2(b).

In conventional seek methods, the profile velocity is chosen as the demand velocity to be periodically outputted to subtractor 54 and the velocity profile indicating the profile velocity as a function of tracks remaining in a seek is stored in a look-up table in the microcomputer 48 so that seeks can be effected as will now be described. At the beginning of the seek, the interface 56 will provide a signal to the microcomputer 48 that a seek is to be made and, further, will place the destination track number to which the seek is to be made on the data bus 64 of the microcomputer 48. (As is conventional in the art, the servo tracks on the disk 12 are numbered from zero at the outermost track.) In response, the microcomputer will determine from the track number of the track presently being followed and the destination track number the number of tracks to go in making the seek and such number will be outputted to the tracks to go counter 46. (The number of the track that is presently being followed can be maintained in the memory of the microcomputer 48 by moving the servo head to track zero as part of he start-up procedure for the disk drive 10 and then updating the current location in memory each time a seek is made.)

Once the counter 46 has been initialized, the profile velocity corresponding to the number of tracks the head is to be moved is outputted to the latch 50 so that the subtractor 54 will provide a control signal that is proportional to the difference between the profile velocity and the actual velocity of the head; that is, zero at the start of the seek. Thus, for example, if the initial and destination tracks are as indicated by the dashed lines 66 and 68 in FIGS. 2(a), 2(b) and 2(c), the microcomputer 48 will call for the maximum velocity the head 20 is to attain during the seek. Since the actual velocity begins at zero, the subtractor will provide a large control signal to the power amplifier 38 to cause a rapid initial rise in the current through the coil 40 as indicated at 70 in FIG. 2(a) in which the current during the acceleration of the head 20 has been indicated in dashed line. The result is that the head 20 will be rapidly accelerated toward the destination track.

As the seek progresses, the transducer head 20 will leave the fine control region about the initial track to pass into a succession of fine control regions about tracks between the initial and destination tracks and, each time the head enters a new fine control region, the demodulator 30 will provide a track crossing pulse to the tracks to go counter 46 to decrement such counter with the result that the counter 46 will contain a continuous record of the number of tracks remaining in the seek to the destination track. The microcomputer 48 is programmed to periodically read the tracks to go counter 48 and, in response to the value contained therein, look up the profile velocity associated with the remaining distance to the destination track in accordance with the stored velocity profile and output the profile velocity to the latch 50. Concurrently, the demodulator 30 generates servo position error signals that are transmitted to the differentiator 42 so that a signal indicative of the actual velocity of the transducer head 20 across the disk 12 continuously appears at the output of the differentiator 42. The actual and profile velocities are transmitted to the inputs of the subtractor 52 so that, each time a new profile velocity is read, a control signal proportional to the difference between the two is transmitted to the power amplifier 38 to adjust the current through the actuator coil 40. Thus, as the velocity of the head 20 approaches the maximum velocity the head is to have during a seek, the current through the coil 48 will drop toward zero as indicated at 72 in FIG. 2(a). Generally, this drop in current will initially be very rapid and will subsequently become zero as the actual velocity of the servo head 20 stabilizes on the maximum velocity Vmax. In order to minimize the time for the seek to be made, the proportionality constants for the power amplifier 38 and the subtractor 54 are made large enough that the current through the coil between the two portions 70, 72 of the current versus time curve will be determined by the power supply voltage and the back emf induced in the coil 40 by movement of the coil through the magnetic field in which it is immersed so that the entire current versus time profile will further exhibit a slowly decaying portion that has been indicated at 74 in FIG. 2(*a*). As the actual velocity of the transducer head 20 approaches the maximum profile velocity Vmax, the control signal from the subtractor 54 will decrease toward zero so that the actual velocity of the transducer head 20 will approach the velocity profile along the dashed line 76 in FIG. 2(*b*).

Once the maximum profile velocity has substantially been attained by the transducer head 20, such velocity will be maintained until the head reaches the distance from the destination track required to decelerate the head 20 from the maximum seek velocity to rest in accordance with the deceleration current profile 58 and the head 20 will then decelerate in accordance with the current profile 58 and portion 60 of the velocity profile derived therefrom.

Figure 2A:
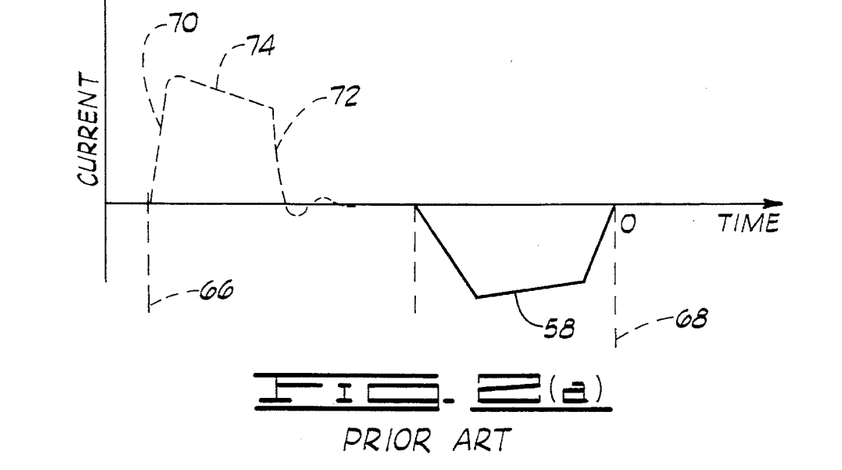
FIG. 2(a) is a graph of actuator current as a function of time during a seek made in accordance with the prior art.
Figure 2B:
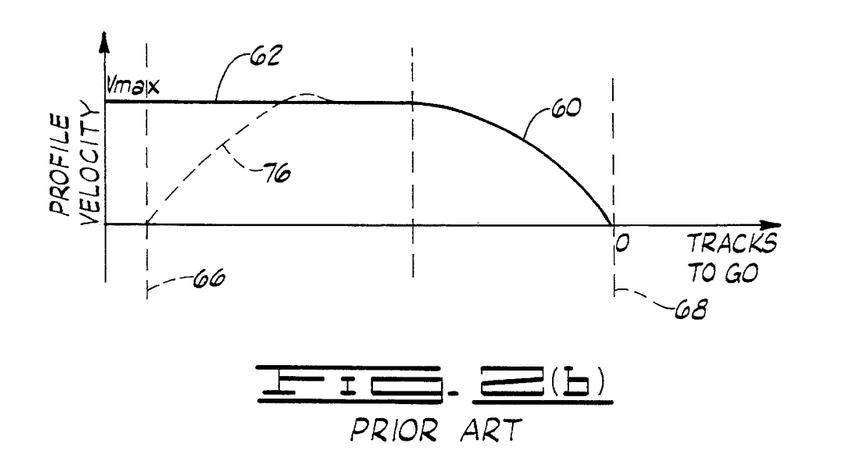
FIG. 2(b) is a graph of a velocity profile developed from the current relation shown in FIG. 2(a).
Figure 2C:
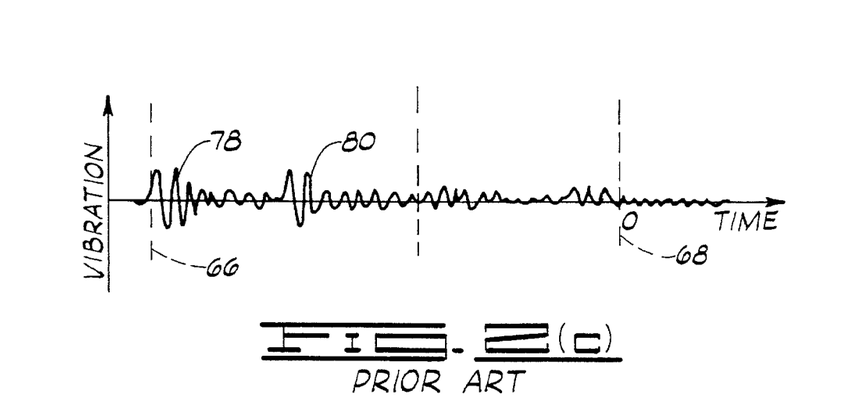
FIG. 2(c) is a graph of the output of an accelerometer mounted on the disk drive versus time during a seek made in accordance with the prior art.

The problem that arises from effecting a seek in this manner has been illustrated in FIG. 2(*c*) wherein is shown the output of an accelerometer mounted on the hard disk drive 10; for example, at any convenient location on the casing (not shown) that contains the disks 12, 14 and the actuator 24 in the assembled drive. As will be clear to those skilled in the art, the sharp increase and subsequent sharp decrease in the actuator coil current indicated at 70 and 72 respectively in FIG. 2(*a*) correspond to a rapidly increasing force between the actuator coil 40 and the magnets (not shown) that provide the magnetic field in which the coil 40 is immersed and a rapid release of such force. The net result is that the actuator coil 40, and the casing in which it is mounted, are subjected to two successive impulses that can excite normal modes of vibration of both the actuator 24 and the casing. Thus, vibration of the casing will exhibit peaks, one for each impulse, that have been illustrated at 78 and 80 in FIG. 2(*c*). The vibration peaks translate into a high level of noise produced by the hard disk drive 10 during the seek. A complaint often voiced by users of computers is that this noise, that occurs every time a relatively long seek is made in accordance with the prior art, is both distracting and annoying.

DESCRIPTION OF THE PREFERRED EMBODIMENT

Figure 3A:
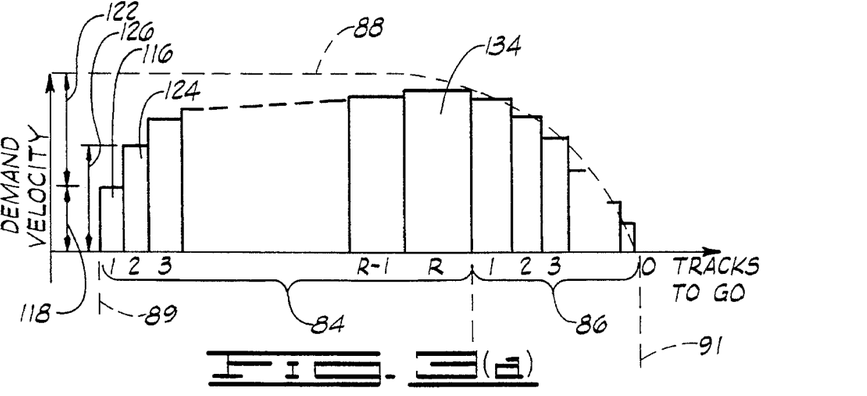
FIG. 3(a) is a graph of demand velocity versus tracks to completion of a seek made in accordance with the method of he present invention.
Figure 3B:
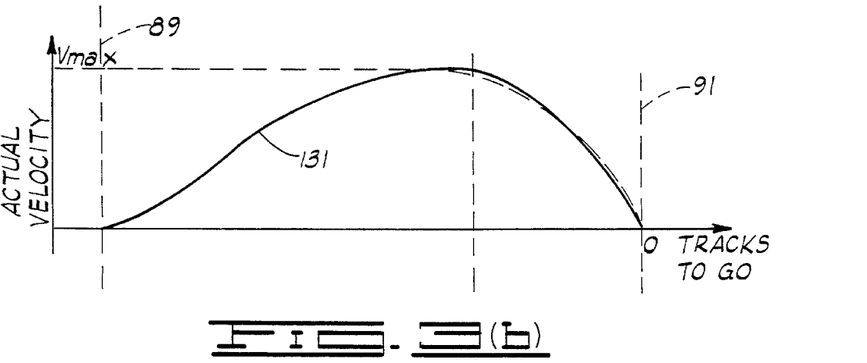
FIG. 3(b) is a graph of actual transducer head velocity versus tracks to completion of a seek made in accordance with the method of the present invention.
Figure 3C:
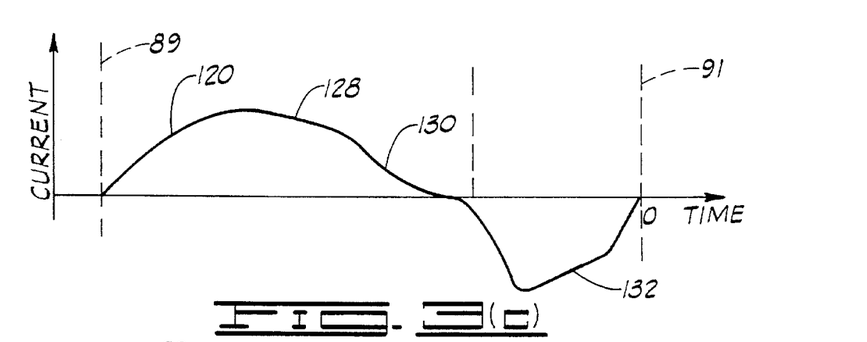
FIG. 3(c) is a graph of actuator coil current versus time for a seek made in accordance with the method of the present invention.
Figure 3D:
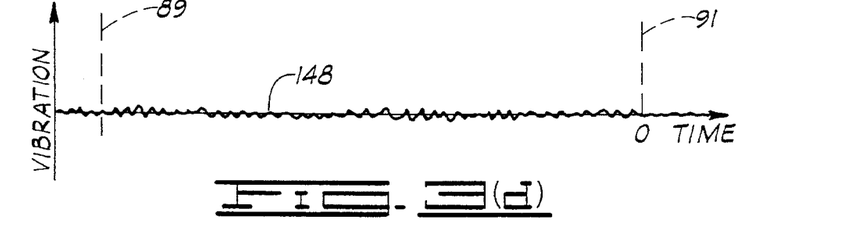
FIG. 3(d) is a graph of the output of an accelerometer mounted on the disk drive versus time during a seek made in accordance with the method of the present invention.
Figure 4:
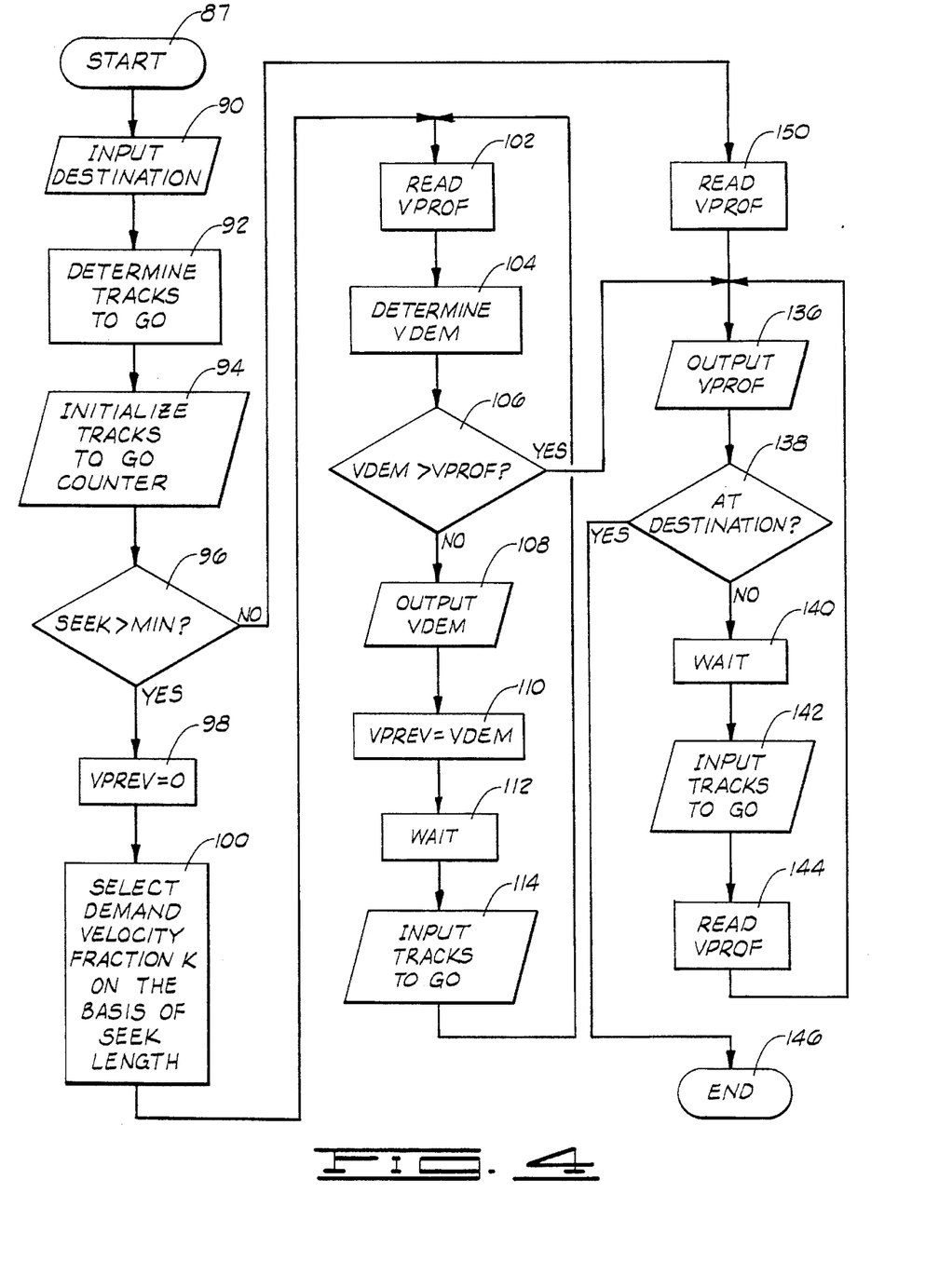
FIG. 4 is a flow chart illustrating the method of the present invention.

The present invention reduces the level of noise emitted by the hard disk drive 10 in a manner that has been illustrated in FIGS. 3 and 4. In particular, the invention contemplates that the acceleration of the transducer head 20 will be effected in accordance with a series of demand velocities derived from the velocity profile during a first sequence of time intervals collectively indicated at 84 in FIG. 3(*a*) and subsequently decelerated in accordance with the profile velocities during a second sequence of time intervals that have been collectively indicated at 86. To this end, a velocity profile is determined and stored in a look-up table in the microcomputer 48 in the same manner that such a table is determined and stored in prior art seek methods. This velocity profile, plotted against number of tracks remaining to the completion of a seek, has been indicated in dashed line at 88 in FIG. 3(*a*). Preferably, the time intervals during which the demand velocities are determined have equal duration and such equality has been indicated in FIG. 3(*a*) by a steady increase in the number of tracks traversed during each interval while the servo head 20 is accelerated and a steady decrease in the number of tracks traversed in each time interval during deceleration of the head 20.

Referring to FIG. 4, a seek in accordance with the present invention starts, step 87, with a call for a seek by the interface 56 and inputting of the destination track, at 90, by the microcomputer 48. From the current location of the servo head 20, the microcomputer 48 determines, at 92, the number of tracks to go in making the seek and initializes the tracks to go counter 46, at 94, in the same manner that such steps are effected in a conventional seek. For purposes of illustration, the initial and destination tracks have been indicated by the dashed lines 89 and 91 in FIGS. 3(*a*), 3(*b*), 3(*c*) and 3(*d*). Following initialization of the tracks to go counter 46, the microcomputer 48 determines whether the seek length exceeds a minimum length, at 96, for a purpose to be discussed below, and if so, initializes a previous velocity (VPREV), stored in the microcomputer 48 memory, to zero at 98 in FIG. 4. The microcomputer 48 then selects a demand velocity fraction K, at 100, that has been previously determined and stored in the microcomputer 48 in a manner to be discussed below. The acceleration of the servo head 20 toward the destination track is then carried out in an acceleration loop comprising the steps 102–114 shown in the central portion of FIG. 4.

Specifically, beginning with the first time interval indicated by the block 102 in FIG. 3(*a*) of the first sequence of time intervals 84, the profile velocity (VPROF) is read from the look-up table in the microcomputer 48 and, from VPROF, a first demand velocity (VDEM) is determined, at 104, in accordance with the relation $$VDEM = K (VPROF - VPREV) + VPREV.$$

Since VPREV has been initialized to zero, VDEM for the first time interval will be a fraction of the profile velocity as indicated by the height 118 of the block 116 in FIG. 3(*a*). This velocity is compared to the profile velocity, step 106, and the loop provided by the steps 102 through 114 is exited if the demand velocity exceeds the profile velocity for a purpose that will become clear below.

If the demand velocity is less than the profile velocity, the demand velocity is outputted to the latch 50, step 108, to cause the subtractor 54 to generate a control signal that is the difference between the demand velocity and the actual head velocity as has been described above for a conventional seek. Accordingly, the servo head will be accelerated toward the destination track as has been described above for the conventional seek by a current passed through the coil 40 of the actuator 24 by the power amplifier 38 in response to the control signal. However, since the demand velocity is a fraction of the profile velocity, the current in the actuator coil 40 will increase at a slower rate than will be the case for a conventional seek as indicated by the initial portion 120 of a coil current to time curve that has been drawn in FIG. 3(*c*). Following output of the demand velocity, the stored value of VPREV is updated to VDEM, step 110, and the microcomputer 48 enters a wait routine, step 112, that is used to establish the sequence of times over which acceleration of the servo head is effected.

At the expiration of the wait routine, the acceleration loop is then repeated for the second of the first sequence of time intervals by again inputting the number of tracks to go, step 114, and returning to the step 102 wherein the profile velocity is read for determination of the demand velocity in accordance with the relation recited above. In this second determination, the previous velocity, now corresponding to the height 118 of the block 116 in FIG. 3(*a*), is incremented by a fraction (the demand velocity fraction) of the amount, indicated at 122 in FIG. 3(*a*), required to make the demand velocity equal to the profile velocity. Thus, the demand velocity for the second of the time intervals in the first sequence 84, indicated by block 124 in FIG. 3(a), will be greater than the demand velocity for the first time interval 116 but less than the profile velocity determined by reading the tracks to go counter 46 and selecting the profile velocity from the look-up table in which the velocity profile is stored. Accordingly, the demand velocity will have a value indicated by the height 126 in FIG. 3(a). The acceleration loop is then continued as described above.

As can be seen from the manner in which the demand velocity for the second time interval 124, and succeeding time intervals of the first sequence, are determined, the demand velocity for each interval during the first sequence will be less than the profile velocity but will more nearly approach the profile velocity with each succeeding interval of the first sequence. The result will be that the actuator coil current will be smaller than the actuator coil current for time intervals in a conventional seek with the result that the current versus time curve for a seek made in accordance with the present invention will be similar to the current versus time curve for a conventional seek as can be seen by comparing FIGS. 2(a) and 3(c). (The widths of the time intervals in FIG. 3(a) have been greatly exaggerated in order to illustrate the method of the present invention. Hence, the current versus time curve illustrated in FIG. 3(c) has been drawn as a continuous curve rather than as a series of steps.) However, the rate at which the current increases and decreases during the acceleration of the servo head 20 will be smaller for the acceleration in accordance with the present invention than for prior art seeks so that the initial increase and subsequent decrease in the accelerating current will have a lower rate of change with time, as indicated at 120, 128 and 130 in FIG. 3(c). Similarly, the velocity of the servo head 20 across the disk 12 will increase more slowly for a seek in which the acceleration of the head 20 is effected in accordance with the present invention than will be the case for a prior art seek as can be seen by comparing FIG. 3(b), wherein the actual velocity of a seek in accordance with the present invention has been plotted, at 131, as a function of distance remaining in the seek, with FIG. 2(b). As will be clear to those of skill in the art, the amount of variation between the current and velocity curves for the present invention and prior art seek will depend upon the choice of the velocity demand fraction, a point whose significance will become clear below. It will also be useful to note at this point that no danger exists that the seek may not be initiated because of forces other than the Lorentz force on the actuator. The demand velocity is steadily increased for each of the time intervals of the first sequence, without regard to the location of the servo head 20, so that the demand velocity must eventually reach a value which, for zero actual velocity, will cause the servo head to accelerate.

The acceleration loop is terminated when the head reaches a distance from the destination track at which the profile velocity decreases from one time interval to the next because of movement of the servo head toward the destination track and the selection of the profile velocity on the basis of the number of tracks remaining in the seek. In the case of a long seek, for which the initial number of tracks to go greatly exceeds the number of tracks required to decelerate the servo head from the maximum velocity chosen to develop the velocity profile 88, this will occur substantially at the distance required to stop the servo head using the current profile, indicated at 132 in FIG. 3(c), used to obtain the velocity profile 88. For shorter seeks, termination of the acceleration loop will occur at a shorter distance from the destination track for which the demand velocity rises to a value less than Vmax but greater than the profile velocity. More particularly, the acceleration loop terminates at any time that the decision block 106 of the acceleration loop indicates that the demand velocity is greater than the profile velocity. When this occurs, as indicated by the final time interval 134 of the first sequence 84 in FIG. 3(a), the acceleration loop exits to a deceleration loop comprised of steps 136 through 144 in the third column of FIG. 4.

In the first time interval of the deceleration loop, the profile velocity that has been determined at steps 114 and 102 of the acceleration loop is outputted, at step 136, as the demand velocity that is used to decelerate the servo head and, after a check, at step 138, as to whether the servo head has reached the destination track, the microcomputer enters a wait routine 140 that determines the lengths of the time intervals of the second sequence 86. Thereafter, the seek is completed in relation to the profile velocity by inputting the number of tracks to go, step 142, from the tracks to go counter 46 at the beginning of each time interval of the second sequence 86, reading the profile velocity, step 144, from the look-up table provided in the microcomputer 48 and returning to the step 136 in which the profile velocity is outputted to the latch 50. The seek terminates, step 146, when the destination track is reached as indicated by the decision block 138.

FIG. 3(d) indicates the result of making a seek in accordance with the present invention. Shown therein is a typical oscilloscope trace 148 for the output of an accelerometer mounted on the case of a hard disk drive illustrating vibration that is induced by a seek carried out in accordance with the present invention. As can be seen by a comparison with FIG. 2(c), vibration of components of the hard disk drive is greatly reduced in comparison to vibration occurring during conventional seek for a consequent reduction in noise produced by the hard disk drive during the seek.

Before continuing; more specifically, before discussing the manner in which the demand velocity fraction is obtained, it will be useful to consider some of the aspects of the present method that have been referred to above but not fully discussed. Initially, it is desirable that seeks be made in as short a time as possible consistent with noise requirements and the decision block 96 in FIG. 4 is included to implement the balance between time for the seek and noise produced thereby. For short seeks, the profile velocity at the start of the seek will be small so that little vibration and noise will be produced by carrying out the seek in a conventional manner in which the demand velocity is selected to be the profile velocity and the control signal transmitted to the power amplifier is the difference between the profile velocity and the actual velocity. Thus, for short seeks which produce little noise, the seek is carried out conventionally by reading the profile velocity, step 150, and immediately entering the deceleration loop. Since the actual velocity of the head is zero at the start of the seek, the deceleration loop will effect both acceleration and deceleration of the servo head 20 in a conventional manner.

Additionally, it has been noted above that the method of the present invention can be used with substantially any hard disk drive. Specifically, in some hard disk drives, the servo pattern includes track addresses and the demodulator transmits these addresses to the microcomputer so that the tracks to go counter is not needed; rather, the number of tracks remaining in a seek is determined directly from the current head location and the address of the destination track so that the profile velocity can be obtained from the look-up table in the microprocessor. Similarly, the differentiator 42 may be eliminated in favor of directly generating the control signal to be transmitted to the power amplifier in accordance with the steps of the method recited above with the actual velocity being calculated within the microcomputer from successive head locations. An important aspect of the present invention is that its practice does not depend upon the precise form of the circuitry of the hard disk drive in which it is practiced. Thus, while an exemplary hard disk drive has been described to provide a basis for understanding the invention, it will be recognized by those of skill in the art that no limitation on the scope of the applicants' claims is intended by such description.

Similarly, no limitation exists as to the form of the velocity profile that may be used in practicing the method. Thus, for example, as discussed in the aforementioned U.S. patent application, Ser. No. 442,194 and as also discussed in U.S. patent application Ser. No. 516,294 entitled "Hard Disk Drive Adaptation Based on Approach Time Measurement" filed Apr. 30, 1990 by Glenn D. Albert, the velocity profile may have adaptive components that are added to a base velocity profile. Again, an important aspect of the present invention is that it accommodates such adaptation in the performance of a seek so that no limitation on the scope of the applicants' claims is intended by the recitation in the description above of obtaining the profile velocity from a look-up table. Such recitation is for exemplary purposes only so that the method of the present invention contemplates that any steps of reading a profile velocity includes not only looking up the profile velocity in a look-up table but also retrieving adaptive elements of the profile from microcomputer memory and adding them to the value obtained from the table.

Another important aspect of the invention lies in the manner in which demand velocity fractions are determined for the practice of the method. As noted above, seek speed as well as noise generated by the seek is an important consideration in the operation of a hard disk drive. Accordingly, the present invention contemplates that the demand velocity fraction will differ for different seek lengths and a plurality of velocity demand fractions will be stored in a look-up table in the microcomputer memory for selection on the basis of the seek length in step 100 of FIG. 4. It is to the determination of these fractions that we now turn.

Initially, it is common practice at the time a hard disk drive is manufactured to replace the microcomputer 48 with a connector to a general purpose digital computer so that the drive can be tested by appropriate programming of such general purpose computer. Thus, the performance of seeks of any selected length can be carried out by merely replacing the microcomputer 48 with such a connector and calling for movement to selected destination tracks from the general purpose computer instead of from the interface 56. Moreover, any selected demand velocity fraction can be used to carry out such seeks. By appropriate programming, seeks of any desired length and using any desired demand velocity fraction can be entered via the keyboard of the general purpose computer.

With such computer in place, appropriate demand velocity fractions can be determined by calling a series of seeks of increasing length in accordance with the conventional seek method while determining whether the seek results in the excessive generation of noise. Two such measures, both quantitative, are the rates at which the actuator coil current rises and falls and the amplitude of the output of an accelerometer mounted on the disk drive case as discussed above. So long as the rate of change of the actuator current is below a preselected value or the accelerometer output is below a preselected maximum, the seek length is considered to be below the minimum seek length for step 96 in FIG. 4. Thus, by steadily increasing the seek length, the minimum seek length for which the method of the present invention will be used can be located. Thereafter, for longer seek lengths, the demand velocity fraction is decreased to determine the demand velocity fraction to be used for successively longer seeks. In particular, equal length seeks are carried out for successively smaller demand velocity fractions until the criterion used to identify an appropriate fraction is met. It has been found by experimentation that a suitable set of fractions can be developed rapidly by selecting fractions for individual seek lengths up to a selected maximum seek length and then making all seeks of greater lengths using a fixed fraction. Thus, for example, in one hard disk drive that has been tested, a suitable look-up table for the demand velocity fractions will have separate entries for each seek length from 31 to 80 track spacings and a constant value for seeks of greater length with the method of the present invention not being used for seeks of 30 tracks or less.

Another aspect of the invention is the facility with which the demand velocity fraction table can be obtained. As has been described above, the criterion for the appropriate demand velocity fraction selection for selected seek lengths can be the rate of change of the actuator coil current during acceleration of the servo head or the maximum vibration of the hard disk drive as measured by an accelerometer mounted on the drive. A more convenient measure, and a measure that is more directly related to the goals of the present invention, is the sound the hard disk drive makes during a seek. Thus, the preferred way of determining demand velocity fractions is to merely listen to the hard disk drive while the series of seeks described above is carried out and to select fractions that will provide an acceptable level of noise.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for moving a transducer head of a rotating disk data storage device from an initial data storage track on a rotating disk to a destination track on the disk, comprising the steps of:

selecting a demand velocity fraction, less than one;

for each of a first sequence of time intervals beginning with the transducer head located at the initial track, accelerating the transducer head toward the destination track by the steps of:

determining the number of tracks between the transducer head and the destination track;

selecting a profile velocity in relation to the number of tracks between the transducer head and the destination track;

determining a demand velocity by incrementing a previous demand velocity by the selected fraction of the difference between the profile velocity and the previous demand velocity, wherein the previous demand velocity for the first time interval is selected to be zero and the previous demand velocity for each remaining time interval of the first sequence is the demand velocity for the previous time interval;

measuring the actual velocity of the transducer head across the disk; and accelerating the transducer head in relation to the difference between the demand velocity and the actual velocity of the transducer head across the disk; and for each of a second sequence of time intervals subsequent to the first sequence, decelerating the transducer head to the destination track by the steps of:

determining the number of tracks between the transducer head and the destination track;

selecting a profile velocity in relation to the number of tracks between the transducer head and the destination track;

measuring the actual velocity of the transducer head across the disk; and decelerating the transducer head in relation to the difference between the actual velocity of the transducer head across the disk and the profile velocity.

2. The method of claim 1 wherein the demand velocity fraction is selected in relation to the number of tracks between the initial and destination tracks.

3. In a method for moving a transducer across a surface of a disk of a disk drive from an initial track on the disk surface to a destination track on the disk surface wherein the transducer is accelerated from the initial track and subsequently decelerated to the destination track and wherein, for each of a sequence of time intervals during acceleration of the transducer, the transducer is accelerated in relation to the difference between the actual velocity of the transducer and a demand velocity determined in relation to the distance between the transducer and the destination track, the improvement wherein the acceleration of the transducer comprises the steps of:

selecting an initial demand velocity for the first of said sequence of time intervals; and thereafter, for each succeeding time interval, incrementing the demand velocity by a selected fraction, less than one, of the difference between a profile velocity, selected in relation to the distance between the transducer head and the destination track, and the demand velocity for the preceding time interval.

* * * * *